…

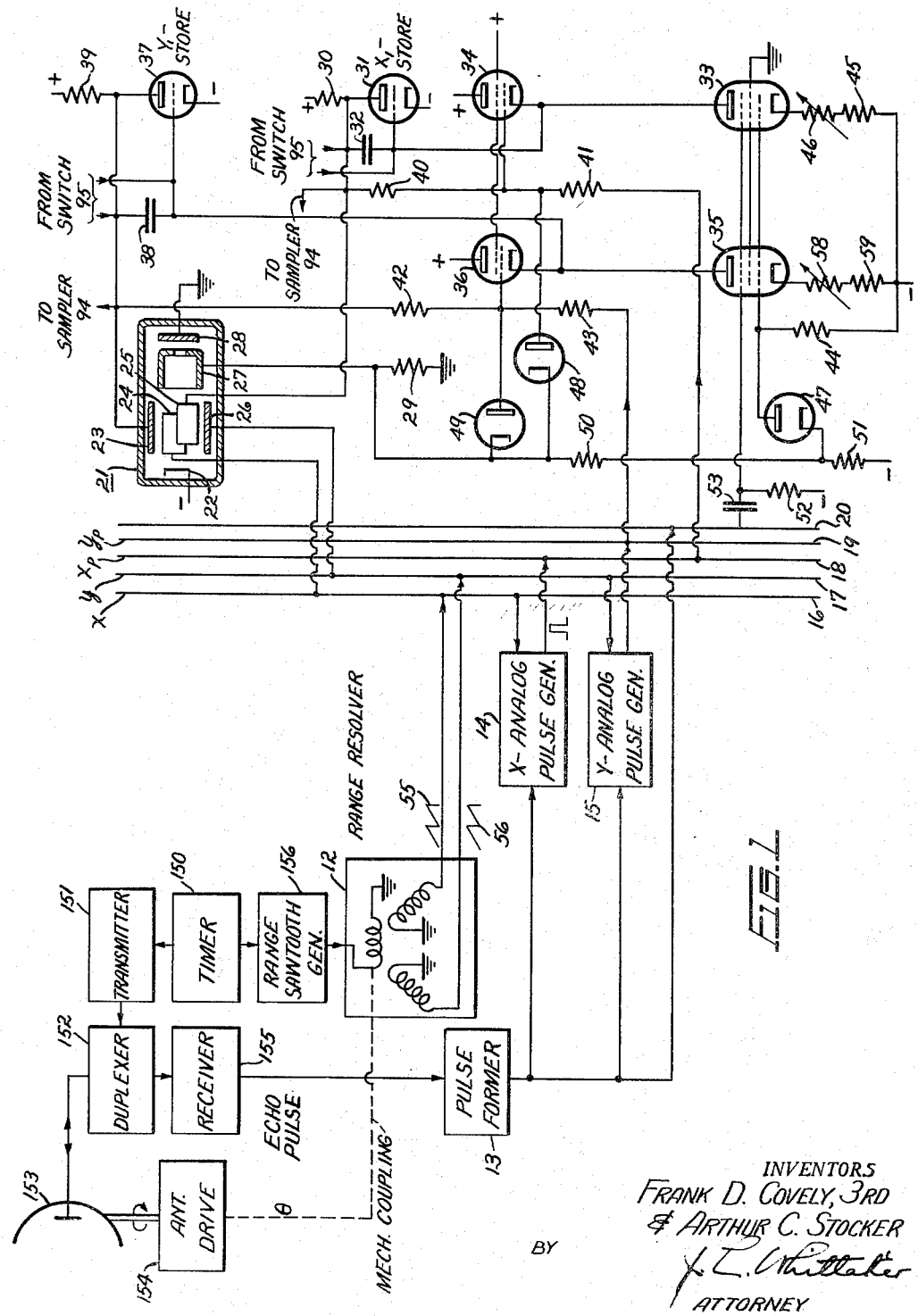

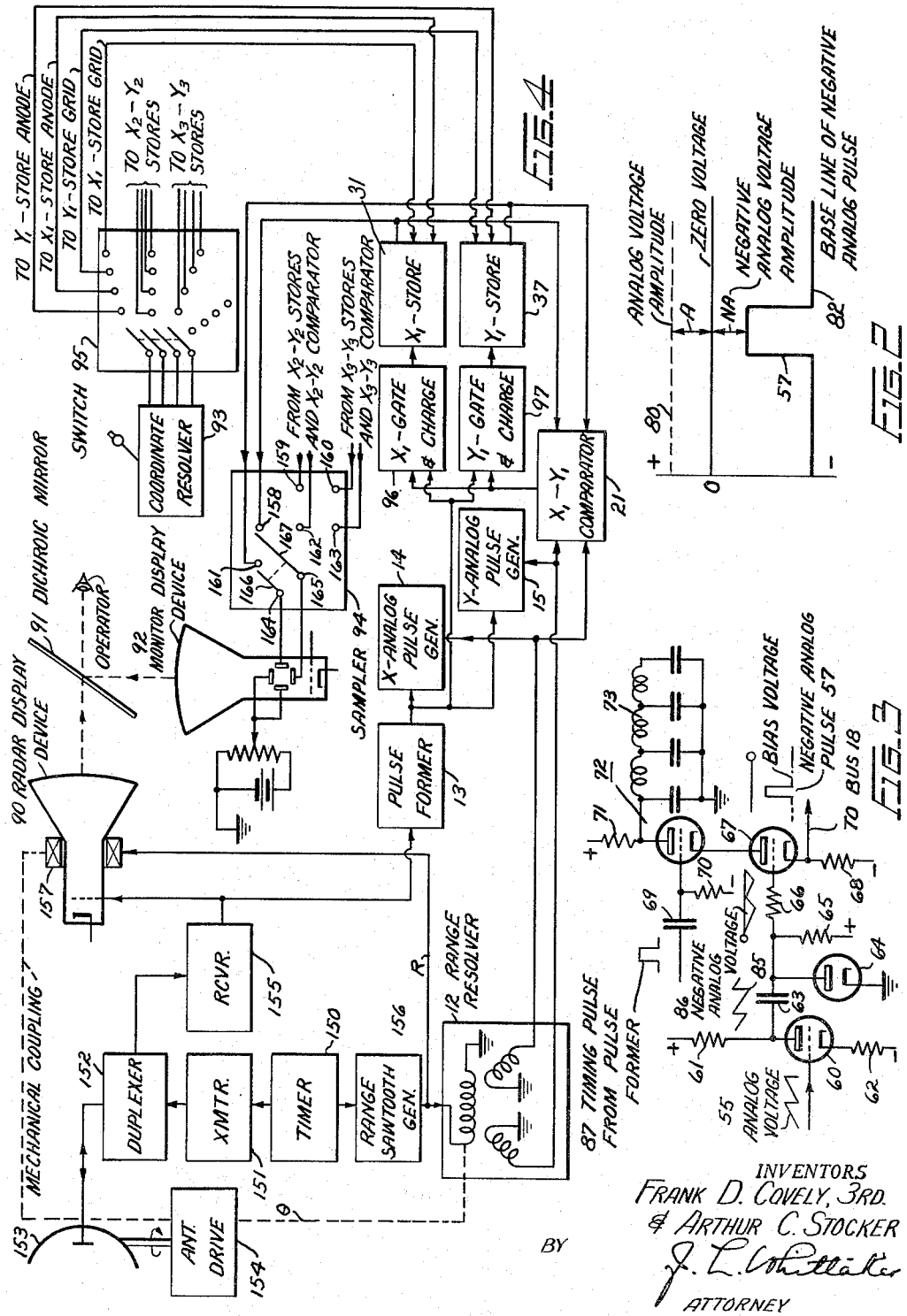

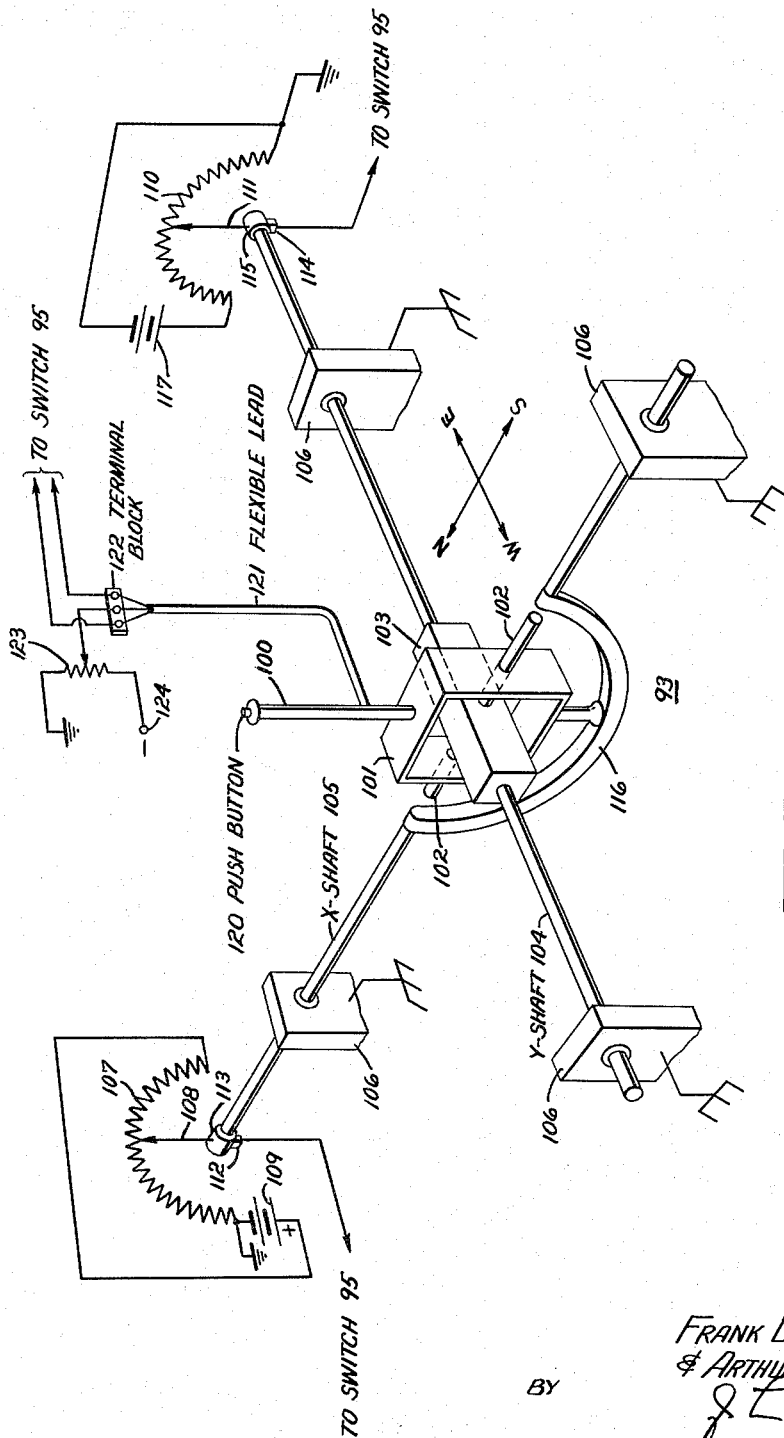

United States Patent Office 2,995,744
Patented Aug. 8, 1961

2,995,744
AUTOMATIC CORRECTION CIRCUIT FOR STORED ELECTRICAL DATA
Frank D. Covely 3rd, Haddonfield, and Arthur C. Stocker, Collingswood, N.J., assignors to Radio Corporation of America, a corporation of Delaware
Filed Jan. 20, 1955, Ser. No. 482,966
22 Claims. (Cl. 343—11)

This application is a continuation-in-part of application Serial No. 454,432, filed September 7, 1954, now abandoned.

This invention relates to the storage of electrical data and, more particularly, to improved circuits and apparatus for the automatic correction of stored electrical data.

As the number of aircraft using the air lanes has increased, the problem of traffic control at airports has become acute. To aid in the automatic surveillance of traffic at airports, Automatic-Track-While-Scan (ATWS) radar systems have been developed. These systems automatically track, and supply electrical position data on, a plurality of moving targets. ATWS radar systems are also useful in the surveillance of ship traffic in port areas and in the designation of targets to military fire control systems.

In ATWS radar systems, a plot of the position, with respect to the radar, of targets whose echoes are received by its rotating antenna is usually displayed on the screen of a P.P.I. (plan-position-indicator) display tube, and, in addition, analog voltages corresponding to the cartesian coordinates (i.e., the X—Y coordinates) of the position with respect to the radar of selected targets are supplied to storage circuits, such as Miller integrators. In a typical system, one set of storage circuits is associated with each selected target and one X- and one Y-storage circuit comprise a set. The stored analog voltages may be used for various purposes, such as automatic orientation of antiaircraft artillery, synthetic display of one or more targets, etc.

To maintain the accuracy of such position data, it is essential to periodically correct the store analog voltages in accordance with changes in the positions of the targets. This is accomplished once per antenna scan by resolving each received target echo signal into the X- and Y-coordinate analog voltages corresponding to the location of the target. The new coordinate analog voltages of each target are then used to correct the set of stores associated with that particular target. This is done by automatically comparing each set of new coordinate analog voltages with the voltages stored in all sets of X—Y stores, selecting the set of stores whose stored voltages most nearly correspond with the new voltages (normally the same set of stores associated with the target during the previous scan), and altering that set of stored voltages to correspond with the new set of coordinate voltages (new position data). This automatic comparison and correction of the stored data with the new data comprises the automatic tracking feature of the ATWS radar systems.

Previous ATWS systems placed the selection and comparison circuitry in the portion of the radar system serving all stores. The proper store was selected by this circuitry and correction data was thereupon coupled to the store. This type of equipment is cumbersome, intricate and requires a vast number of components.

An object of this invention is to provide an improved method of, and means including an improved and simplified circuit for, automatically correcting stored electrical data.

Another object of this invention is to provide an improved and simplified circuit for automatically correcting stored electrical data in the form of voltage analogs.

A further object of this invention is to provide an improved and simplified voltage correcting circuit especially adapted for use in Automatic-Track-While-Scan radar systems.

An important feature of the present invention is to provide each store with its own associated selection and comparison components, couple the corrected position data to all stores and allow the store whose stored voltage most nearly corresponds with the incoming data to accept it. Unless the number of targets to be tracked becomes unusually large, the present invention results in simpler and more compact equipment.

The foregoing objects and advantages of the present invention are accomplished by providing for the correction of a stored analog voltage in accordance with changes in the condition or position of the data or object which the analog voltage represents. A storage circuit shunts a constant-current circuit which, in turn, is in series with a variable-current circuit. The current in the variable-current circuit is controlled by variations in the condition of the represented object. When the value in storage circuit correctly represents the condition of the object, the current through the variable-current circuit equals the current through the constant-current circuit and no current flows into the storage circuit. But when the condition of the object varies from that represented by the value in the store, the current through the variable-current circuit is either greater or smaller than the fixed current which is drawn by the constant-current circuit and, therefore, a compensating differential current flows either into or out of the storage circuit, thereby correcting the value of the stored analog voltage.

The invention may be adapted for radar tracking applications by use of a comparator circuit which maintains the variable- and constant-current circuits in a non-conducting condition at all times other than the period immediately prior to and during reception of echoes from the target being tracked.

The invention will be described in greater detail with reference to the accompanying drawing in which:

FIGURE 1 is a partially blocked schematic circuit diagram of a system, in accordance with this invention, which will store and correct target position data provided by a radar set;

FIGURE 2 is a diagrammatic representation of a negative analog pulse;

FIGURE 3 is a schematic diagram of a circuit which can be employed to provide negative analog pulses;

FIGURE 4 is a block circuit diagram of a system in accordance with this invention including apparatus which permits an operator to initially select targets to be automatically tracked thereafter; and FIGURE 5 is a diagram of the joystick mechanism including a schematic of the associated potentiometers.

Pulse former

Referring to FIGURE 1, a system for correcting position data obtained by a radar set is provided. The radar equipment may, for example, comprise a pulse-type search radar delivering target range and azimuth data and presenting this data in polar coordinate form on a plan-position-indicator (P.P.I.) display scope.

A timer 150, which may be a blocking oscillator or other pulse-generating circuit, delivers trigger pulses to the transmitting circuits 151 which generate high-power pulses of high-frequency electromagnetic energy. These pulses are applied through a duplexer 152, which may be a gas-filled, transmit-receive switch, to the antenna 153, which radiates the energy into space. The antenna is rotated azimuthally by means of the antenna drive mechanism 154, which may be a motor.

If a radiated pulse strikes a target, such as an aircraft, it may be reflected back to the antenna 153. If so, it is impressed upon the duplexer 152, whence it is applied to the receiving circuits 155, where it is amplified and detected.

The echo pulse is then fed into a pulse former 13, which may be a blocking oscillator. The pulse former 13 serves to reform the echo pulse into a pulse having a steeply rising front and a constant amplitude, so that the circuits which are intended to respond to, or be synchronized by, the stimulus of the echo pulse will be actuated in a positive manner which does not vary from pulse to pulse.

Range resolver

The range sweep voltage, or range sawtooth, is a sawtooth voltage supplied to the sweep coil 157 (see FIGURE 4) of an electromagnetic display tube 90 to sweep the electron beam radially outward from the center of the display tube to its periphery in time synchronism with the radiated pulse. The position of the electron beam at any given instant relative to its center or zero position corresponds to the distance the radiated pulse has travelled from the radar antenna 153. Since the position of the electron beam depends upon the amplitude of the range sawtooth voltage at that instant, the distance, or range, of the radiated pulse (and, therefore, of any target it strikes) can be determined from the amplitude of the range sawtooth at that instant.

The range sawtooth is generated by applying a trigger pulse from the timer 150 to the range sawtooth generator 156, which may be any one of a number of well-known circuits which generate linear sawtooth voltages.

To completely locate the geographical position of the radiated pulse in relation to the radar antenna 153, it is also necessary to take into account the azimuthal position of the radiated pulse, which in turn depends on the angular displacement of the antenna with respect to a fixed azimuthal reference line. Each succeeding radial sweep is slightly displaced from the previous one by rotating the sweep coil 157 in synchronism with the azimuthal rotation of the radar antenna 153. The resultant scan is called a P.P.I. (plan-position-indicator) scan.

The process of completely locating the geographical position of the radiated pulse is accomplished by applying the range sawtooth to a range resolver 12 which separates it into two component sawtooth voltages, for example, an east-west component hereinafter called the X-sawtooth 55, and a north-south component hereinafter called the Y-sawtooth 56. The outputs of the range resolver 12 are synchronous sawtooth voltages 55 and 56, the relative amplitudes of which vary with the angle of rotation of the radar antenna.

Analog pulse generator

The X- and Y-sawteeth 55 and 56 are impressed upon the X-bus bar 16 and Y-bus bar 17, respectively, and then coupled to the X-analog pulse generator 14 and Y-analog pulse generator 15, respectively.

An "analog voltage" is defined herein as a voltage whose amplitude represents some other quantity. Thus, at any given instant, in one form of the invention, the amplitude of the X-sawtooth voltage 55 represents the east-west geographical position of a target reflecting a transmitted pulse with respect to the location of the radar antenna 153, and, therefore, the X-sawtooth voltage 55 is an analog of the east-west geographical position of said target at that instant. The X-sawtooth voltage 55 is hereinafter interchangeably referred to as the X-analog voltage 55.

A "negative analog pulse" is defined herein as a pulse whose amplitude measured from zero voltage is the negative of some analog voltage. Thus, in FIGURE 2, a negative analog pulse 57 is shown, having an amplitude NA which is the negative of the positive analog voltage 80 indicated by the dotted line, the amplitude of which is indicated by the letter A. It will be noted that, in this particular case, the base line 82 of the pulse 57 does not coincide with the zero voltage level but is even more negative than the amplitude NA of the negative analog pulse 57. This is necessary because the base voltage is used as a bias for tubes 34 and 36 as will be described later.

Continuing with FIGURE 1, only the parts of the system concerned with operations upon the X-analog voltage, or X-sawtooth, will be described in detail, since the parts concerned with operations upon the Y-analog voltage, or Y-sawtooth, are similar in construction and function.

A circuit for forming such a negative analog pulse is shown in FIGURE 3. The analog voltage, the X-sawtooth voltage 55 from the X-bus 16, is impressed on the control grid of an electron tube 60 operating as an amplifier with a gain of approximately unity by virtue of the relative proportions of resistors 61 and 62. The waveform 85 on the plate of tube 60 is a negative-going replica of the impressed sawtooth 55. A D.-C. restorer circuit comprising condenser 63, diode 64, and resistor 65 establishes ground potential, or zero volts, as a base voltage from which each negative excursion of the sawtooth originates. This wave 86 is then impressed upon a cathode follower tube 67 which operates without plate voltage most of the time.

The grid current of the cathode follower tube 67 is limited by grid resistor 66, and the cathode is returned through resistor 68 to a negative supply voltage which establishes the base line 82 of the negative analog pulse 57 shown in FIGURE 2. The pulse itself is formed by applying plate voltage to the cathode follower tube 67 at the proper time, this action being accomplished by means of a delay-line pulse generator stage 72 which is triggered on by pulses 87 from the pulse former 13 (see FIGURE 1) and is cut-off by the removal of its plate voltage upon termination of the pulse generated by the delay line 73. Thus, the amplitude NA of the negative analog pulse 57 which is obtained across cathode resistor 68 corresponds to the value of the X-sawtooth at the instant an echo pulse is received, and therefore corresponds to the X-component of the geographical location of the radar's target. This negative analog pulse 57 is then impressed upon the $X_p$-bus 18.

The manner in which a pulse is formed by the gas tube 72 and the delay line 73 in conjunction with the timing pulse from the pulse former 13 is explained in Waveforms, vol. 19, Radiation Laboratory Series, pages 239–241.

The X-sawtooth voltage 55 is coupled from the X-bus 16 to the X-analog pulse generator 14, whose output, negative X-analog pulses 57, is impressed upon the $X_p$-bus 18. Thus the value of the X-analog pulse 57, measured from zero, is indicative of the X-position of the target, the echo from which initiated the formation of the X-analog pulse 57.

Store circuits

It will be assumed that the radar is in the process of tracking a target and, therefore, that the X storage condenser 32 of a Miller integrator of store circuit 31 has a charge corresponding to a previous X-position of the target. The operation of a Miller integrator circuit is described by B. H. Briggs in the August 1948 issue of Electronic Engineering on pages 243–247. Although other types of storage devices may be employed, utilization of the Miller integrator circuit is preferred. A change in the charge or voltage that is fed to the grid-cathode circuit of the Miller integrator tube results in practically no change in grid voltage but in a large linear change in plate voltage. The voltage on the anode of the Miller integrator tube 31 with respect to the grid, or the charge stored in the condenser 32, is then an analog of the X-component of the position of the radar target, and is impressed upon one of the horizontal plates of the comparator tube 21, while the X-sawtooth 55 is impressed on the other.

Comparison device (Comparator)

The comparison device, or comparator tube 21, comprises an evacuated electron beam tube including an electron gun with its associated control grid, and accelerating and focusing electrodes, all of which are represented in schematic form in FIGURE 1 by a cathode 22. The comparator tube 21 also includes two pairs of orthogonal deflecting plates 23, 24, 25, and 26, a cup-shaped collecting electrode 27 having an aperture in its base, and a target electrode 28 located adjacent to the aperture in the collecting electrode (cup) 27. The analog voltages derived from the X- or Y-storage tubes 31 and 37, are applied to deflecting plates 25, 23 respectively in each of the opposed pairs of plates. The other plates 24, 26 in each pair are respectively provided with the sawtooth voltages 55 and 56 on the X-bus 16 and Y-bus 17. In the particular embodiment illustrated in FIGURE 1, the X-voltages 55 and 56 are coupled to the horizontal pair of deflecting plates 24 and 25, although they may be coupled to the vertical deflecting plates 23 and 26 if so desired.

During the major portion of the antenna's rotation, the amplitudes of the X- and Y-sawteeth voltages 55 and 56 will differ widely from the anode voltages of the Miller integrator tubes 31 and 37. The electron beam from the cathode of the comparator, or gating, tube 21 will, therefore, be deflected, striking the cup 27 and passing to ground through resistor 29 connected thereto. This results in a high negative potential across resistor 29, which potential is transferred freely through diodes 47, 48, and 49 to the control grids of the electron tubes 33, 34, 35, and 36, and biases these tubes far beyond cut-off.

Variable- and constant-current circuits

Variable-current tube 34 is a tetrode biased by a combination of two voltages. The first is the voltage across resistor 29, which is the result of the current flow from the negative supply voltage to ground through resistors 51, 50 and 29, and the current flow through resistor 29 alone due to the electron beam from the comparator 21. The second is the voltage tapped off the voltage divider formed by resistors 40 and 41, on the high potential end of which is impressed the voltage from the X-store condenser 32 and on the low potential end of which is impressed the negative potential of the base line of the X-analog pulse.

Constant-current tube 33 whose plate is in series with the cathode of variable-current tube 34, is a pentode also biased by two voltages. The first of these is applied to the control grid and is the voltage across resistors 50 and 29 of the voltage divider comprising resistors 51, 50 and 29. The second is the negative supply voltage and is coupled to the suppressor grid through resistor 52.

The biasing of the variable-current and constant-current tubes 36 and 35 associated with the Y-store 37 is accomplished in a manner similar to that described above for tubes 34 and 33 associated with the X-store 31.

As the radar antenna 153 sweeps toward the area in which the target was previously located, the amplitudes of the X- and Y-sawteeth 55 and 56 approach equality with the amplitudes of the stored voltages of the Miller integrator tubes 31 and 37. The electron beam then experiences very little deflecting potential and passes through the hole in the center of the cup 27 to the grounded target 28. The previous bias across resistor 29, due to the action of the electron beam, disappears, leaving the voltage on resistor 29 only slightly negative. The diodes 48 and 47 then cease to conduct leaving the variable-current tube 34 biased beyond cut-off only by the negative voltage that forms the base of the X-analog pulse 57, and constant-current pentode tube 33 biased beyond cut-off only by the negative voltage coupled to its suppressor grid through resistor 52. At this time, constant-current tube 33 is conducting some screen grid current, but no plate current.

Now, as the radar antenna 153 sweeps across the target, an echo pulse is received. The re-formed echo pulse is coupled to the suppressor grid of constant-current tube 33 and raises it above cut-off. The function of constant-current tube 33 is to conduct a constant, predetermined value of current during the time an echo pulse is being received. The negative bias on its suppressor grid through resistor 52 as reduced by the pulse from the bus 20, the negative bias impressed on its control grid by the action of the voltage divider comprising resistors 51, 50, and 29, and the cathode bias generated across resistors 45 and 46 are adjusted so that this predetermined current will be maintained through constant-current tube 33 during the time the echo pulse is being received.

Simultaneously with the impressing of the re-formed echo pulse on the suppressor grid of constant-current tube 33, a negative X-analog pulse 57 is impressed on bus 18 and thence on resistor 41. While these pulses persist, the potential on the control grid of variable-current tube 34 is the result both of the old analog voltage carried in store and the new negative analog voltage on bus 18. Thus, the voltage on the grid of 34 varies in proportion to the difference between the stored and the true analog voltages. This difference is a measure of the correction that must be made.

Thus, when the location of the target remains unchanged, and variable-current tube 34 conducts the same amount of current as constant-current tube 33, no current will flow into the Miller integrator storage circuit, which is effectively in shunt with constant-current tube 33, and there will be no change in the quantity of charge stored in storage condenser 32.

However, if the position of the target has changed since the last sweep of the radar antenna 153, the value of the X-analog pulse 57 will be different from the value of the anode voltage of the Miller integrator tube 31. A net voltage, either positive or negative from its previous value, will now exist at the control grid of variable-current tube 34, causing it to conduct either more or less current than constant-current tube 33. Under these conditions, a current will flow into or out of storage condenser 32, correcting the amount of charge stored in the condenser until it corresponds to the new X-position of the target as indicated by the value of the negative X-analog pulse 57.

The small rheostat 46 in the cathode of the constant-current tube 33 is provided so that the currents flowing through tubes 33 and 34 may be adjusted for equality when the voltage on the grid of tube 34 indicates that no correction is needed.

In the description of the system, the scale of the stored voltage on the anode of the Miller integrator tube 31 was assumed to be equal to the scale of the negative X-analog pulse voltage 57, and resistor 40 was assumed to be equal to resistor 41. These voltage scales may be different, provided that resistors 40 and 41 are properly proportioned and the base value of the negative analog pulse 57 is sufficient to keep variable-current tube 34 biased beyond cut-off between pulses.

The part of the system concerned with the correction of the Y-analog voltage on the storage condenser 38 are the Miller integrator tube 37, the constant-current tube 35, the variable-current tube 36, and their associated components, all of which correspond respectively to the following X-analog components: the Miller integrator tube 31, the constant-current tube 33, the variable-current tube 34, and their associated components.

It is to be understood, of course, that a position-store circuit, which comprises all of the components to the right of the bus bars in FIGURE 1, is required for each target

Target acquisition mechanism

As previously explained, once a set of stores contains X- and Y-coordinate analog voltages approximately equal to the incoming X- and Y-analog pulses, recurrent periodic correction of the stores automatically results. The problem is to initially associate a set of stores with a specific target and insert the proper analog voltages corresponding to the position of that specific target.

Referring to FIGURE 4, the outputs of all stores are coupled to the sampler 94. The invention includes a plurality of sets of stores, but since they are all substantially identical only a single set, comprising the $X_1$-store 31 and the $Y_1$-store 37, is illustrated. The sampler 94 may be a high-speed, double-pole, multi-contact, rotary switch, or an electronic switching circuit. If a rotary switch is employed as illustrated, all X-stores are coupled to one set of contacts 158, 159, 160, and all Y-stores to the other set of contacts 161, 162, 163 and X- and Y-stores of a single set being, respectively, coupled to identically positioned stations, or contacts, on the poles 164, 165. Although only three sets of contacts are illustrated it is to be understood that there are as many sets of contacts as there are sets of stores.

The X- and Y-coordinate analogs are then coupled sequentially, by the rotation of the contact arms 166, 167 of the switch, to the X- and Y-deflection plates, respectively, of the monitor display device 92, which may be a cathode ray tube indicator.

The monitor indicator 92 and the radar indicator 90, on which the detected video output of the receiving circuits 155 is displayed, are arranged at right angles to each other and a dichroic mirror 91 is placed at an angle of 45° with respect to each of the display devices 90 and 92. A dichroic mirror is a device which transmits light of one color and reflects light of another color. Light from the radar display device 90 is transmitted through the dichroic mirror to the eye 91 and light from the monitor display device 92 is reflected from the dichroic mirror 91 to the eye, the optical arrangement of the display devices and mirror being such that the target indications on the monitor display device 92 are superposed upon their counterparts on the radar display device 90. At the eye of the operator, the transmitted light from the radar display device 90 is colored differently from the reflected light from the monitor display device 92 (e.g., the transmitted light may be blue and the reflected light may be red).

When the radar antenna 153 first picks up a target, it is displayed only on the radar display device 90 and appears blue to the operator. If this target were being automatically tracked by the radar, coordinate analog voltages corresponding to its position would be stored in a set of X- and Y-stores and a target indication would appear on the monitor display device 92. The dichroic mirror 91 imparts a red color to this target indication, but it is superposed upon the blue target indication of the radar display device 90 and the combination is white to the eye of the observer. Thus, when the operator sees a white indication, he knows that the target is being automatically tracked, but when he sees a blue indication he knows that coordinate analog voltages for the target must be inserted in a set of empty X- and Y-stores.

As explained subsequently in greater detail, the operator selects a set of X—Y stores by means of the manual switch 95. He depresses the push-button 120 in the handle 100 of the joystick and moves the handle 100 until the target indication on the monitor display device 92, which appears red to him, is superposed upon the original blue target indication. He then releases the push-button 120 and moves the manual switch 95 to its "off" position, whereupon the ATWS radar begins to track the target automatically.

Coordinate resolver

The coordinate resolver is a device by means of which direct-current analog voltages corresponding to the rectangular coordinates of the position of any target on the radar display device 90 may be derived. The particular coordinate resolver 93 employed in this embodiment comprises a joystick mechanism which permits two perpendicular shafts to be rotated in either possible direction by moving a single lever attached to both.

Referring to FIGURE 5, a joystick mechanism which furnishes X- and Y-rectangular coordinate voltages in accordance with the position of the joystick handle 100 is illustrated. The shafts 105 and 106 are supported by four shaft supports 106 mounted on a base (not shown). The joystick handle 100 is separated into two parts by a yoke 101, to which the two parts are affixed. The lower part of the handle 100 rides in a groove between the tracks which forms the X-shaft linkage 116. If the orientation of the X-shaft 105 is north-south and that of the Y-shaft 104 is east-west, the lower part of the joystick handle can move in a north or south direction in the groove of the X-shaft linkage 116.

The joystick handle 100 may also be moved in the east-west direction by rotating its yoke 101 around a pair of pivot dowels 102 affixed to the Y-shaft coupling block 103 and extending through the yoke 101. Rotating the handle 100 in the east-west direction rotates the X-shaft 105, to the end of which a slip ring 113 is attached. An output voltage proportional to the position of the handle 100 is taken from the contact arm 108 of a potentiometer 107, the voltage increasing in positive amplitude as the handle 100 is moved from its extreme easterly position to its extreme westerly position.

Similarly, movement of the handle 100 from south to north rotates the Y-shaft 104 and furnishes an increasing positive voltage from the Y-shaft potentiometer 110. The output voltages are taken from brushes 114 and 112 on the slip rings 115 and 113 affixed to the Y- and X-shafts 104 and 105, respectively. The X- and Y-outputs are respectively coupled through a switch 95 to the X- and Y-stores of one of the sets of stores (see FIGURE 1). The switch 94 is a four-pole, multi-position, manually operated switch, having at least one "off," or unconnected position. In all other positions, there are four contacts: one connected to the anode of an X-store tube; one to the grid of the same tube; one to the anode of the Y-store tube associated with said X-store tube as a set; and one to the grid of the Y-store tube. Each set of four contacts is coupled to a different set of X—Y stores. Thus, the X- and Y-shafts may be compared to the X- and Y-axes of a rectangular coordinate plot, and the joystick mechanism is a means of resolving the location of the top section of the joystick handle 100 with respect to the axes into X- and Y-coordinate analog voltages.

It may be noted that in the particular type of joystick mechanism indicated in this embodiment the lever can be moved not only in the north-south and east-west directions but may also be moved directly to the desired position—thus, if the lever is in a vertical position at the origin of the X—Y coordinate axes, it could, for example, be moved directly along the 45° line bi-secting the angle between the X—Y axes, or in any other desired path.

As a consequence of the circuit arrangement and constants of the X- and Y-stores 31 and 37, the stored analog of the X-component of the position of a target ranges from zero volts for the most westerly position to approximately +100 volts for the most easterly position with zero range being represented by approximately +50 volts. Similarly, the stored analog of the Y-component of the position of a target ranges from zero volts for the most southerly position to approximately +100 volts for the most northerly position with zero range being represented by approximately +50 volts. This necessitates grounding the potentiometers 107 and 110 at the points shown in FIGURE 5, so that the outputs from the potentiometers 107 and 110 vary from zero volts to approximately +100 volts as the joystick handle is moved from its most westerly (or southerly) position to its most easterly (or northerly) position.

Also, in order to establish the zero range position of the electron beam of the monitor display device 92 in the center of its screen, a positive voltage equal to approximately 50 volts must be applied to the pair of deflection plates on which signals from the sampler 94 are not impressed (FIGURE 4).

The joystick handle 100 also contains a push-button switch 120. This switch 120 has two poles which are coupled to the contact arm of a potentiometer 123. One terminal 124 of the potentiometer is coupled to a source of direct current voltage more negative than that to which the cathodes of the Miller stores tubes 31 and 37 are coupled. The moving arm of the potentiometer 123 is adjusted so that the voltage tapped off is equal to the grid voltage required to afford zero range output voltage from the stores 31 and 37. The output contacts of the push-button switch 120 are connected by means of flexible leads 121 to a terminal block 122 and thence through the switch 95 to the grid electrodes of the set of X- and Y-stores selected by the switch 95.

The operator selects a set of X—Y stores by operating the switch 95. He then depresses the push-button switch 120 and moves the joystick handle 100 to the correct position as previously explained. If any charges have been retained in those stores from a previous use, the voltages applied to the grids and anodes of the stores correct them to the values now desired. The operator then releases the push-button switch 120 and moves switch 95 to the "off" position. Automatic tracking is then initiated.

It is to be noted that other means, such as a pair of independent potentiometers having their contact arms connected to ordinary knobs, may be employed in place of a joystick mechanism 93. The operator would then use one of his hands to operate one knob and the other hand to operate the other knob.

What is claimed is:

1. An electrical circuit comprising, in combination, storage means for storing a first voltage as a charge proportional to the amplitude of said voltage, connection means for a source of input voltage from which said first voltage is derived, and a comparison circuit coupled to said storage means and said connection means for comparing said input voltage and said stored voltage and, when their difference is smaller than a given amount, means for varying the amount of charge stored in said storage means in accordance with the magnitude and sense of the difference between said first voltage and said stored voltage.

2. An electrical circuit comprising, in combination, storage means for storing a first voltage as a charge proportional to the amplitude of said voltage; connection means for a source of input voltage from which said first voltage is derived; and a comparison circuit including an electron beam device coupled to said storage means and to said connection means for comparing said stored voltage and said input voltage, for producing a biasing voltage when the difference between said stored voltage and said input voltage is greater than a predetermined amount, and for producing a gating signal when said difference is less than said predetermined amount, and a charging circuit, normally maintained in non-conducting condition by said biasing voltage and operative in response to said gating signal, for altering the charge stored in said storage means in accordance with the magnitude and sense of the difference between said stored voltage and said first voltage, said charging circuit being coupled to said connection means, said storage means and electron beam device.

3. An electrical circuit comprising, in combination, storage means for storing an analog voltage as a charge proportional to the amplitude of said voltage; connection means for a source of input voltage from which said analog voltage is derived; and a comparison circuit coupled to said storage means and said connection means for comparing said input voltage and said stored voltage and for varying the amount of charge stored in said storage means in accordance with the magnitude and sense of the difference between said compared voltages when said difference is smaller than a predetermined amount, said comparison circuit including a variable current device, a constant current device connected in series with said variable current device, and storage means connected to receive the difference in currents passed by said two devices, the current conducted by said variable current device being equal to that conducted by said constant current device when the amplitudes of said analog voltage and stored voltage are equivalent.

4. An electrical circuit comprising, in combination, storage means for storing an analog voltage as a charge proportional to the amplitude of said voltage; connection means for a source of input voltage from which said analog voltage is derived; and a comparison circuit coupled to said storage means and said connection means for comparing said input voltage and said stored voltage and for varying the amount of said charge stored in said storage means in accordance with the magnitude and sense of the difference between said compared voltages, when said difference is smaller than a predetermined amount, said comparison circuit including an electron beam device provided with means for producing a beam of electrons traveling along a given path, at least one pair of means for deflecting said beam from said given path on the application of one or more pairs of deflecting signals, each one of a given pair of deflecting signals being applied in the same sense to a different one of a pair of deflecting means, and collecting means for collecting said electrons when said beam is deflected more than a predetermined angle from said given path; means coupled to said collecting means for producing an enabling signal when the difference between said stored voltage and said input voltage is smaller than a predetermined amount, and a charging circuit coupled to said connection means, said storage means and said electron beam device and operative in response to said enabling signal, for altering the charge stored in said storage means in accordance with the magnitude and sense of the difference between said analog voltage and said stored voltage.

5. Apparatus for storing and correcting electrical data, comprising, in combination, storage means for storing a voltage proportional to a quantity as a charge; a normally cut-off variable current device for producing a current, when conducting, which varies in accordance with variations in said quantity; a normally cut-off constant current device in series with said variable current device for producing a current, when conducting, which is equal to the current conducted by the variable current device in the absence of a change in said quantity, said storage means being connected to receive the difference in currents passed by said two devices, when they conduct; and a comparison device coupled to said storage means for comparing the voltage stored with another voltage and, when they are within given limits, rendering said two devices conductive.

6. Apparatus for storing and correcting electrical data, comprising, in combination, storage means for storing a charge proportional to a variable quantity; a variable-current device having a current which varies in accordance with variations in said quantity; a constant current device in series circuit with said variable current device, said storage means being connected to receive the difference in currents passed by said two devices; and a comparison device coupled to said storage means, variable current device, and constant current device for controlling current flow through said series circuit.

7. In combination, a variable current device; a constant current device effectively connected in series with said variable current device; connections for a source of signal voltage to be stored, storage circuit, and means connecting said storage circuit to said source connections and to said current devices to respond to the difference in currents passed by said two devices.

8. In combination, a variable current device; a constant current device effectively connected in series with said variable current device; connections for a source of signal voltage to be stored, a storage circuit, and means connecting said storage circuit to said source connections and to said current devices to correct the store in said storage circuit as a function of the difference in currents passed by said two devices.

9. In combination, a variable current device, a constant current device effectively connected in series with said variable current device; connections for a source of signal voltage to be stored, a storage circuit, means connecting said storage circuit to said source connections and to said current devices to receive the difference in currents passed by said two devices; and means responsive to a difference in voltage between that stored in said storage circuit and said signal voltage, when said difference is different from a predetermined value, for controlling the amount of current passed by said variable current device.

10. In the combination as set forth in claim 9, said variable current device comprising a tetrode and said constant current device comprising a pentode.

11. In combination, a variable current device; a constant current device effectively connected in series with said variable current device; a Miller store, and means connecting said Miller store to said current devices to receive the difference in currents passed by said two devices.

12. In combination, a variable current device comprising an electron discharge device having a control element; a constant current device effectively connected in series with said variable current device; a storage circuit, means connecting said circuit to said current devices to receive the difference in currents passed by said two devices; a voltage divider network connected at one end to said storage circuit and having a connection at its other end for a negative analog of a voltage to which it is desired to charge said storage circuit; and a tap on said voltage divider network connected to said control element for applying a voltage to the latter which, when the negative analog voltage is equal in absolute magnitude to a voltage stored in said storage circuit, causes the variable current device to conduct the entire current passed by the constant current device.

13. In combination, a pentode; a tetrode effectively connected in series with said pentode; a Miller store including a triode and a storage capacitor connected between the anode and control grid of said triode; a connection from the common connection of said pentode and tetrode to the control grid of said Miller store; a voltage divider network connected at one end to the anode of said Miller store and adapted to receive a voltage at its other end, one of the control elements of said tetrode being connected to the center tap of said voltage divider network; means for normally maintaining both said tetrode and pentode cut-off; and means for simultaneously rendering said pentode and tetrode conductive, and applying a voltage to said other end of said voltage divider network.

14. A radar system comprising, in combination, means for transmitting pulses to a target and receiving said pulses after reflection from said target; means operatively associated with said transmitting and receiving means for deriving a voltage indicative of a spatial coordinate of said target; a storage circuit for storing said voltage; and means responsive to changes in said coordinate for correcting said stored voltage including a first current conducting device, a second current conducting device effectively connected in series with said first current conducting device, means responsive to a difference between the voltage indicative of said spatial coordinate at one instant and the voltage indicative of said spatial coordinate at another instant for controlling the amount of current conducted by one of said devices, and said storage circuit being connected to receive the difference in currents conducted by said two devices.

15. A radar system as set forth in claim 14, wherein one of said current conducting devices comprises a variable current device and the other of said current conducting devices comprises a constant current device, said means responsive to said difference in voltages being connected to control the amount of current conducted by said variable current device.

16. Apparatus for storing and correcting electrical data, comprising, in combination, storage means for storing a charge proportional to a quantity; a normally cut-off variable current device for producing a current, when conducting, which varies in accordance with variations in said quantity; a normally cut-off constant current device in series with said variable current device for producing a current, when conducting, which is equal to the current conducted by the variable current device in the absence of a change in said quantity, said storage means being connected to receive the difference in currents passed by said two devices, when they conduct; and a comparison device coupled to said storage means and responsive to a change in said quantity, when said change is within given limits, for rendering said two devices conductive, said comparison device including an electron beam tube having an electrode on which the beam normally impinges for normally maintaining said devices cut-off, and means responsive to a change in said quantity, when said change is within said given limits, for deflecting said beam to a position such that it does not strike said electrode.

17. Apparatus for storing and correcting electrical data, comprising, in combination, storage means for storing a charge proportional to a quantity; a normally cut-off variable current device for producing a current, when conducting, which varies in accordance with variations in said quantity; a normally cut-off constant current device in series with said variable current device for producing a current, when conducting, which is equal to the current conducted by the variable current device in the absence of a change in said quantity, said storage means being connected to receive the difference in currents passed by said two devices, when they conduct; and a comparison device coupled to said storage means and responsive to a change in said quantity, when said change is within given limits, for rendering said two devices conductive, said comparison device including an electron beam tube having an electrode on which the beam normally impinges, means responsive to a change in said quantity which is less than a predetermined value for deflecting said beam to a position such that it does not strike said electrode, impedance means connected between said electrode and a point of reference potential, a biasing voltage being developed across the latter when the beam impinges on said electrode, and connections from said impedance means to said two devices for applying said biasing voltage to said devices to maintain them cut-off.

18. In combination, storage means for storing a voltage as a charge having a magnitude proportional to the amplitude of said voltage; a normally cut-off variable current device for producing a current, when conducting, which varies in accordance with variations in said voltage; a normally cut-off constant device in series with said variable current device for producing a current, when conducting, which is equal to the current conducted by the variable current device in the absence of a change in said voltage, said storage means being connected to receive the difference in currents passed by said two devices, when they conduct; and a comparison device comprising an electron beam tube having an electrode on which the beam impinges when deflected through an angle greater than a given angle, first deflection means connected to said storage means for deflecting said beam in accordance with the charge stored by said storage means, second deflection means connected to receive said voltage for deflecting said beam in accordance with said voltage, impedance means connected between said electrode and a point of reference potential, a biasing voltage being developed across said impedance means when the beam impinges on said electrode, and connections from said impedance means to said two devices for applying said biasing voltage to the devices for maintaining them cut-off.

19. In combination, first means to which a voltage may be applied; second means to which a voltage may be applied; means including switch means operatively associated with said first and second means and actuated when the voltages applied thereto differ by greater than a predetermined value, said switch means being open in its actuated condition and closed in its unactuated condition; storage means coupled to said first means and applying a voltage thereto, when charged; means connected to said second means for applying a voltage thereto; and means for charging said storage means in accordance with said last-named voltage, when the latter differs from the voltage on said storage means by said predetermined value or less, coupled through said switch means to said storage means.

20. In the combination as set forth in claim 19, said first and second means comprising deflection means of an electron beam tube, and said means including switch means comprising an electrode on which the beam impinges when said voltages differ by said predetermined value or less, and electronic switch means maintained open when said beam impinges on said electrode and closed when it does not.

21. In the combination as set forth in claim 19, said switch means including a constant current device, and a variable current device connected in series with said constant current device, the current conducted by said variable current device being controlled by the voltage applied to said second means, and said storage means being connected to receive the difference in currents passed by said two devices.

22. In combination, a cathode ray beam device including an electrode on which the beam impinges solely when deflected through an angle greater than a given angle, and a pair of deflection means for deflecting said beam through an angle greater than said given angle when the deflection voltages applied thereto differ by more than a predetermined value; storage means connected to one of said deflection means and applying a voltage thereto, when charged; switch means connected to said electrode and maintained open when the beam impinges on said electrode and closed when it does not; means for applying a voltage to said other deflection means; and means for charging said storage means in accordance with the last-named voltage coupled through said switch means to said storage means, whereby when the stored voltage and the charging voltage differ by said predetermined value, or less, said switch means is closed and said charging means may charge said storage means.

References Cited in the file of this patent

UNITED STATES PATENTS

| | | |
|---|---|---|
| 2,172,746 | Young | Sept. 12, 1939 |
| 2,516,356 | Tull | July 25, 1950 |
| 2,568,213 | Bath | Sept. 18, 1951 |